(12) United States Patent
Ohnishi

(10) Patent No.: US 8,150,138 B2
(45) Date of Patent: Apr. 3, 2012

(54) MEDICAL INSTRUMENT AND MEDICAL INSTRUMENT CONTROL METHOD

(75) Inventor: Junichi Ohnishi, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/177,027

(22) Filed: Jul. 6, 2011

(65) Prior Publication Data

US 2011/0311124 A1     Dec. 22, 2011

Related U.S. Application Data

(63) Continuation of application No. PCT/JP2011/055044, filed on Mar. 4, 2011.

(30) Foreign Application Priority Data

Jun. 2, 2010   (JP) .................................. 2010-127187

(51) Int. Cl.
   *G06K 9/00*    (2006.01)
   *G06K 9/62*    (2006.01)

(52) U.S. Cl. ........................................ 382/134; 382/224

(58) Field of Classification Search .......... 382/128–134, 382/173, 217, 218, 224, 305, 312; 600/454, 600/485
   See application file for complete search history.

(56) References Cited

U.S. PATENT DOCUMENTS

| 7,477,768 B2 * | 1/2009 | Kaufman et al. .............. 382/128 |
| 7,773,785 B2 * | 8/2010 | Murphy et al. ................ 382/128 |
| 7,903,849 B2 * | 3/2011 | Kimura .......................... 382/128 |
| 7,968,851 B2 * | 6/2011 | Rousso et al. ........... 250/370.09 |
| 2006/0025671 A1 | 2/2006 | Kusunoki |
| 2010/0296709 A1 * | 11/2010 | Ostrovsky-Berman et al. ............................. 382/128 |

FOREIGN PATENT DOCUMENTS

| JP | 2003-033349 | 2/2003 |
| JP | 2003-339644 | 12/2003 |
| JP | 2006-034585 | 2/2006 |
| JP | 2007-117384 | 5/2007 |
| JP | 2008-142481 | 6/2008 |
| JP | 2008-529641 | 8/2008 |

OTHER PUBLICATIONS

Abstract of International Publication No. WO 2006/085254 A1, dated Aug. 17, 2006.

* cited by examiner

*Primary Examiner* — Kanjibhai Patel
(74) *Attorney, Agent, or Firm* — Scully, Scott, Murphy & Presser, P.C.

(57) ABSTRACT

A navigation apparatus includes: a storage portion that stores three-dimensional image data of an examinee that is previously acquired; an organ extracting portion that extracts a predetermined organ from the three-dimensional image data; a first region designating portion that designates a tumor in the three-dimensional image data; a blood vessel extracting portion that extracts a plurality of blood vessels that are inside the organ from the three-dimensional image data; a blood vessel classifying portion that classifies the blood vessels into either arteries or veins; and a second region extracting portion that, based on three-dimensional image information of the blood vessels, extracts a tumor resection region that is a region that is classified based on anatomical features of the organ and that includes a tumor.

12 Claims, 15 Drawing Sheets

MEDICAL INSTRUMENT AND MEDICAL INSTRUMENT CONTROL METHOD

CROSS REFERENCE TO RELATED APPLICATION

This application is a continuation application of PCT/JP2011/055044 filed on Mar. 4, 2011 and claims benefit of Japanese Application No. 2010-127187 filed in Japan on Jun. 2, 2010, the entire contents of which are incorporated herein by this reference.

BACKGROUND OF THE INVENTION

1. Field of the Invention

The present invention relates to a medical instrument that performs navigation for treatment that a surgeon performs with respect to an examinee by extracting a second region that is one part of an organ of the examinee that includes a first region that is designated by the surgeon, and a method of controlling the medical instrument.

2. Description of the Related Art

Conventionally, when resecting a tumor of a lung of an examinee such as, for example, when resecting lung cancer tissue, a lobectomy in which an entire right lobe or left lobe is resected has been widely performed. In this regard, in recent years, to preserve postoperative pulmonary function and maintain cardiopulmonary function, resection of a major lobe of a part of one lung or resection of a pulmonary segment of a part of a major lobe has been performed with respect to localized tumors.

In this regard, Japanese Patent Application Laid-Open Publication No. 2008-142481 discloses an apparatus that carries out segmentation of the pulmonary lobes into units of pulmonary segments based on a CT image.

Further, Japanese Patent Application Laid-Open Publication No. 2008-529641 discloses a method that separates pulmonary blood vessels into arteries and veins based on a three-dimensional image.

SUMMARY OF THE INVENTION

A medical instrument according to one embodiment of the present invention includes: a storage portion that stores three-dimensional image data of inside a body of an examinee that is previously acquired; an organ extracting portion that extracts a predetermined organ from the three-dimensional image data; a first region designating portion that designates a first region of the organ in the three-dimensional image data; a blood vessel extracting portion that extracts a plurality of blood vessels that are inside the organ from the three-dimensional image data; a blood vessel classifying portion that classifies the plurality of blood vessels that the blood vessel extracting portion extracts into either arteries or veins; a template creating portion that creates a blood vessel region template composed of a blood vessel-related region in which a diameter of at least either one of the arteries and the veins classified by the blood vessel classifying portion is increased by a predetermined amount; and a second region extracting portion that, based on the blood vessel region template, extracts a second region that is a region that is classified according to anatomical features of the organ and that includes the first region.

A medical instrument control method according to another embodiment of the present invention includes: a data storage step of storing three-dimensional image data of inside a body of an examinee that is previously acquired; an organ extraction step of extracting a predetermined organ from the three-dimensional image data; a first region designating step of designating a first region of the organ in the three-dimensional image data; a blood vessel extraction step of extracting a plurality of blood vessels that are inside the organ from the three-dimensional image data; a blood vessel classifying step of classifying the plurality of blood vessels that are extracted in the blood vessel extraction step into either arteries or veins; a template creation step of creating a blood vessel region template composed of a blood vessel-related region in which a diameter of at least either one of the arteries and the veins classified in the blood vessel classifying step is increased by a predetermined amount; and a second region extraction step of extracting a second region that is a region that is classified according to anatomical features of the organ and that includes the first region, based on the blood vessel region template.

DETAILED DESCRIPTION OF THE PREFERRED EMBODIMENTS

First Embodiment

Figure 1A:
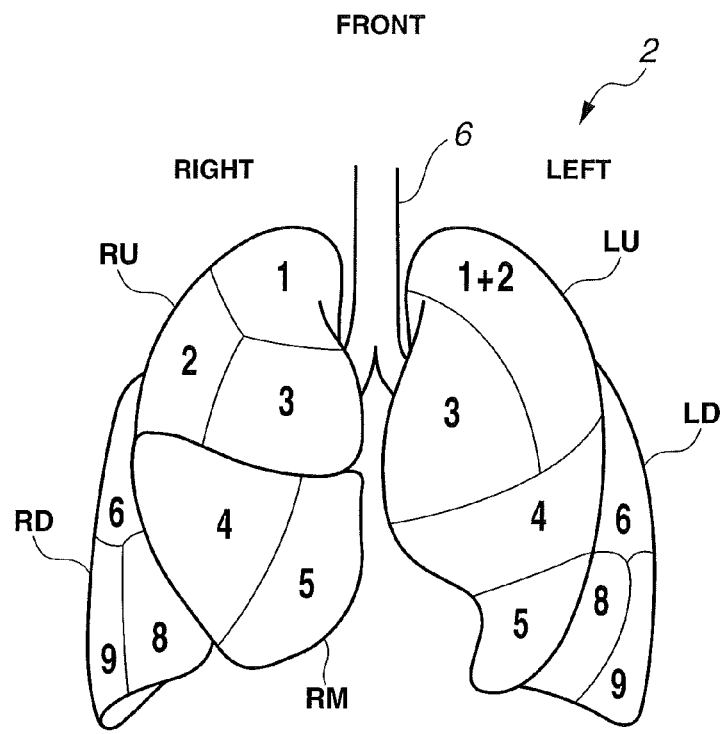
FIG. 1A is a view of lungs as observed from a front for describing regions into which the lungs are classified based on anatomical features thereof.
Figure 1B:
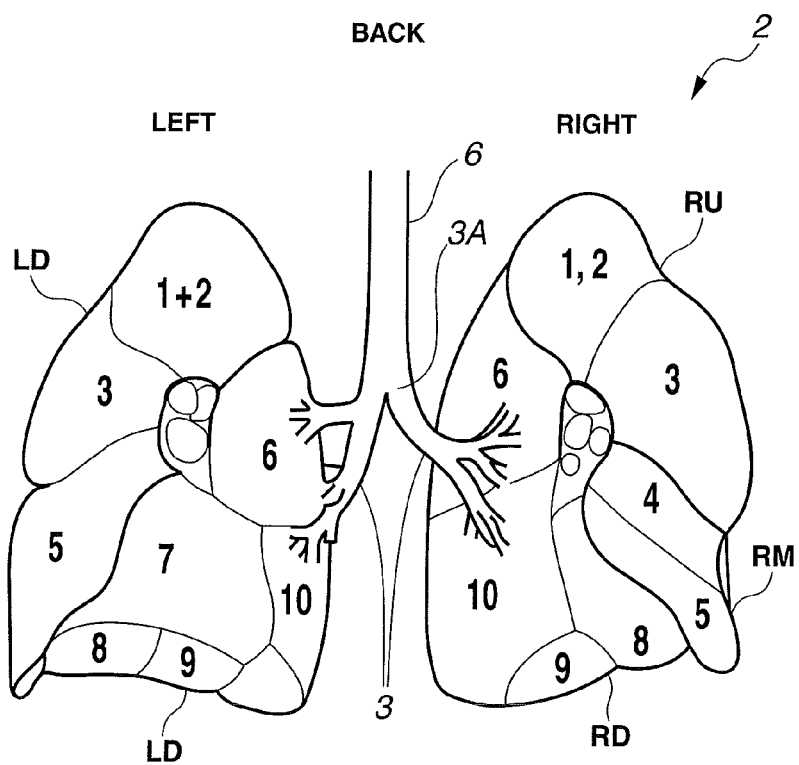
FIG. 1B is a view of lungs as observed from a rear for describing regions into which the lungs are classified based on the anatomical features thereof.

Hereunder, a navigation apparatus 1 for pulmonary tumor resection as a medical instrument according to a first embodiment of the present invention is described with reference to the drawings. As shown in FIG. 1A and FIG. 1B, lungs 2 are separated into a plurality of parts based on anatomical features, in other words, based on a physiological classification. More specifically, there are two lungs, namely, a left lung and a right lung. The right lung is composed of, in order from a top, an upper lobe RU, a middle lobe RM, and a lower lobe RD. The left lung is composed of an upper lobe LU and a lower lobe LD. These five pulmonary lobes are called "major lobes". The right upper lobe RU is separated into three pulmonary segments (hereunder, may also be referred to as "lobules") that are denoted by reference numerals 1, 2, and 3. The right middle lobe RM is separated into two pulmonary segments that are denoted by reference numerals 4 and 5. The right lower lobe RD is separated into five pulmonary segments that are denoted by reference numerals 6, 7, 8, 9 and 10. The left upper lobe LU is separated into four pulmonary segments that are denoted by reference numerals 1+2, 3, 4, and 5. The left lower lobe LD is separated into four pulmonary segments that are denoted by reference numerals 6, 8, 9 and 10.

In this connection, as shown in FIG. 1, other than an area in a vicinity of a carina 3A that connects from a trachea 6, bronchi 3 are inside the lungs 2 and can not be observed from outside.

Figure 2:
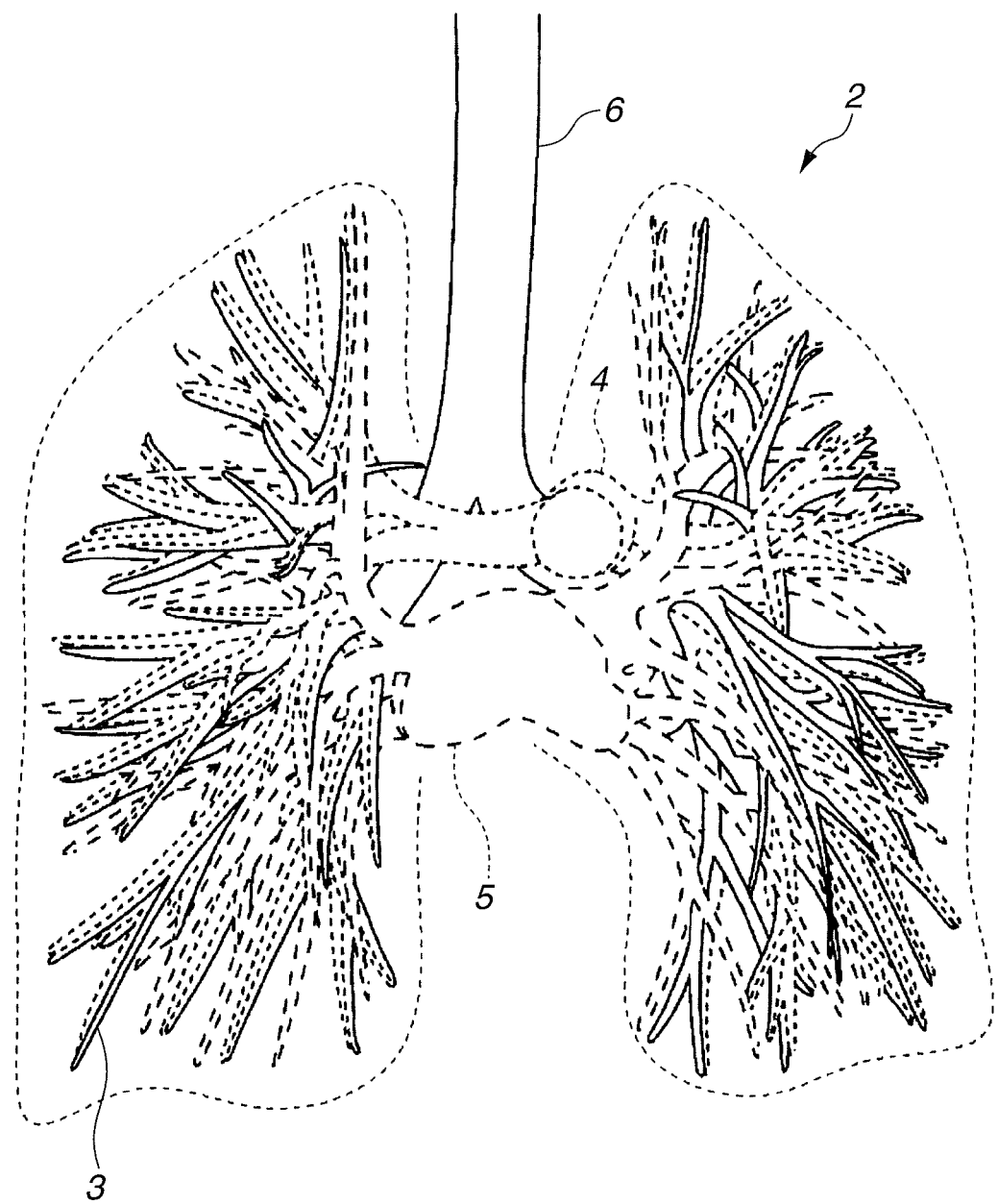
FIG. 2 is a view for describing blood vessels and bronchi of the lungs.

As shown in FIG. 2, the bronchi 3, pulmonary arteries 4, and pulmonary veins 5 are inside the lungs 2, and similarly to the bronchi 3, it is not possible to observe the pulmonary arteries 4, the pulmonary veins 5, or a tumor from outside of the lungs 2. Consequently, when resecting a tumor, it is not easy for the surgeon to decide a region that enables complete resection of the tumor.

Figure 3:
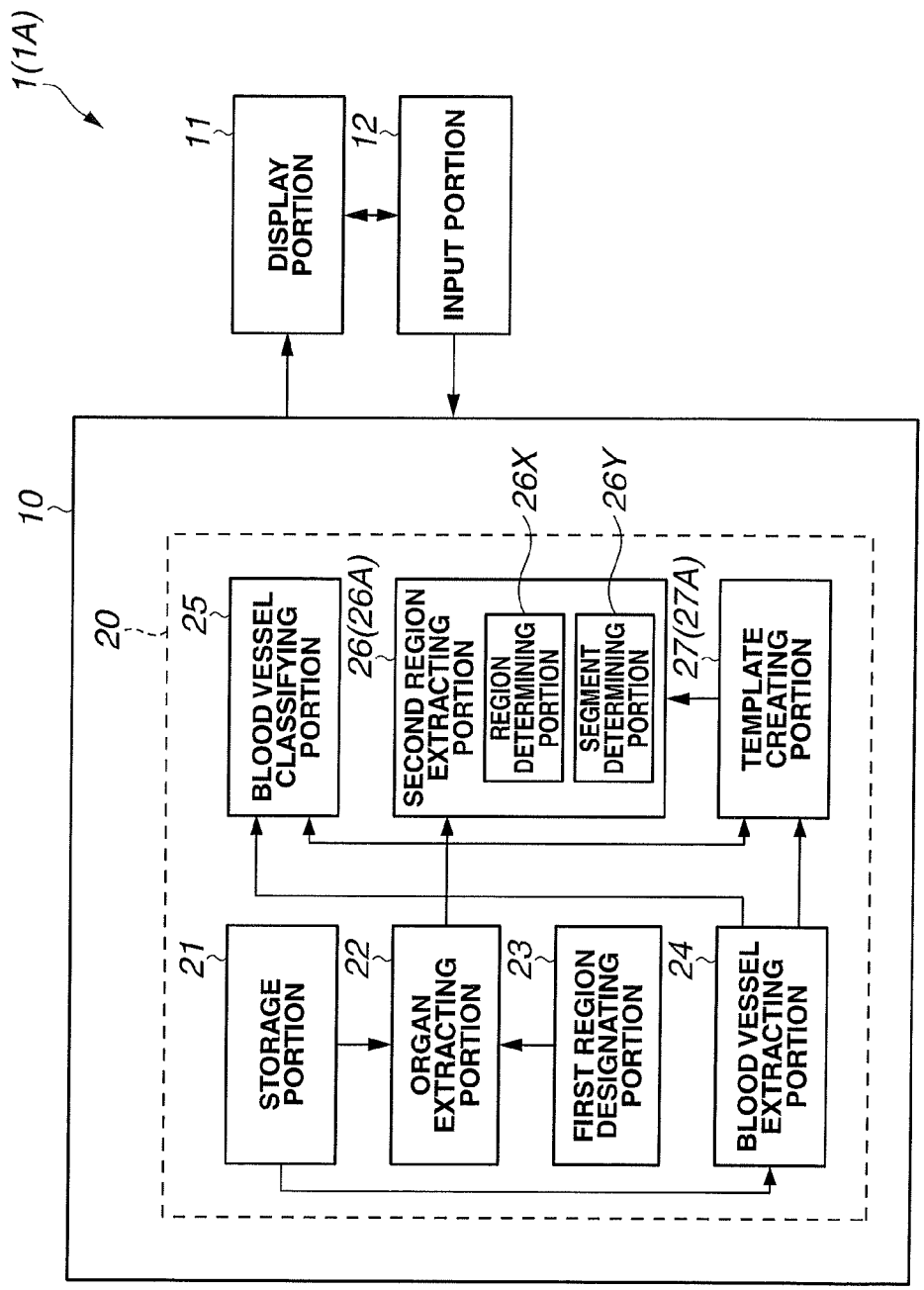
FIG. 3 is a configuration diagram for describing a configuration of a navigation apparatus according to a first embodiment.

As shown in FIG. 3, the navigation apparatus 1 includes an extracting unit 10, a display portion 11 as display means, and an input portion 12 as input means. The display portion 11 displays a processing result of the extracting unit 10. The input portion 12 is a keyboard, a mouse, a touch panel, or the like. The surgeon uses the input portion 12 to input information regarding the examinee, designate a position and size of a tumor based on an image of the lungs that is displayed on the display portion 11, and input an instruction for changing an observational direction of an image that is displayed on the display portion 11 or a display state of a transparent display or the like in accordance with a purpose.

The extracting unit 10 includes a storage portion 21 as storage means, an organ extracting portion 22 as organ extracting means, a first region designating portion 23 as first region designating means, a blood vessel extracting portion 24 as blood vessel extracting means, a blood vessel classifying portion 25 as blood vessel classifying means, a second region extracting portion 26 as second region extracting means, and a template creating portion 27 as template creating means. Although each of the functional portions of the extracting unit 10 may be constituted by respectively independent hardware, a configuration may also be adopted in which, for example, a CPU 20 that is a control portion of the extracting unit 10 has functions of all of the functional portions of the extracting unit 10. More specifically, a configuration may be adopted in which the CPU 20 reads and executes a program stored in an unshown storage medium or the like to implement the respective functional portions.

The storage portion 21 stores three-dimensional image data of inside the body of an examinee that is previously acquired. The organ extracting portion 22 extracts a predetermined organ, for example, the lungs and bronchi, from the three-dimensional image data stored in the storage portion 21. The surgeon designates a tumor as a first region in the three-dimensional image data by means of the first region designating portion 23 through the input portion 12. The blood vessel extracting portion 24 extracts blood vessels inside the lungs, that is, pulmonary arteries and pulmonary veins. The blood vessel classifying portion 25 classifies blood vessels that the blood vessel extracting portion 24 extracts into either arteries or veins. The template creating portion 27 creates a blood vessel region template composed of a blood vessel-related region in which a diameter of a blood vessel is increased by a predetermined amount, based on three-dimensional image information of the blood vessel.

The second region extracting portion 26 extracts a second region (tumor resection region) that includes the first region (tumor) based on three-dimensional image information of blood vessels for at least either one of the arteries or the veins that the blood vessel classifying portion 25 has classified the blood vessels into, more specifically, based on information of the blood vessel-related region that includes the first region.

More specifically, the second region extracting portion 26 includes a region determining portion 26X as region determining means and a segment determining portion 26Y as segment determining means. The region determining portion 26X determines whether a tumor exists in any template based on information regarding the organ that includes positional information of a tumor that is obtained from the organ extracting portion 22 and information regarding a blood vessel-related region that is obtained from the template creating portion 27. Coordinate information is used for the respective determination processes.

If a tumor exists in any of the templates, the segment determining portion 26Y determines the blood vessel-related region template in which the tumor is included, and also identifies an associated pulmonary segment based on the information regarding the veins or arteries.

Figure 4:
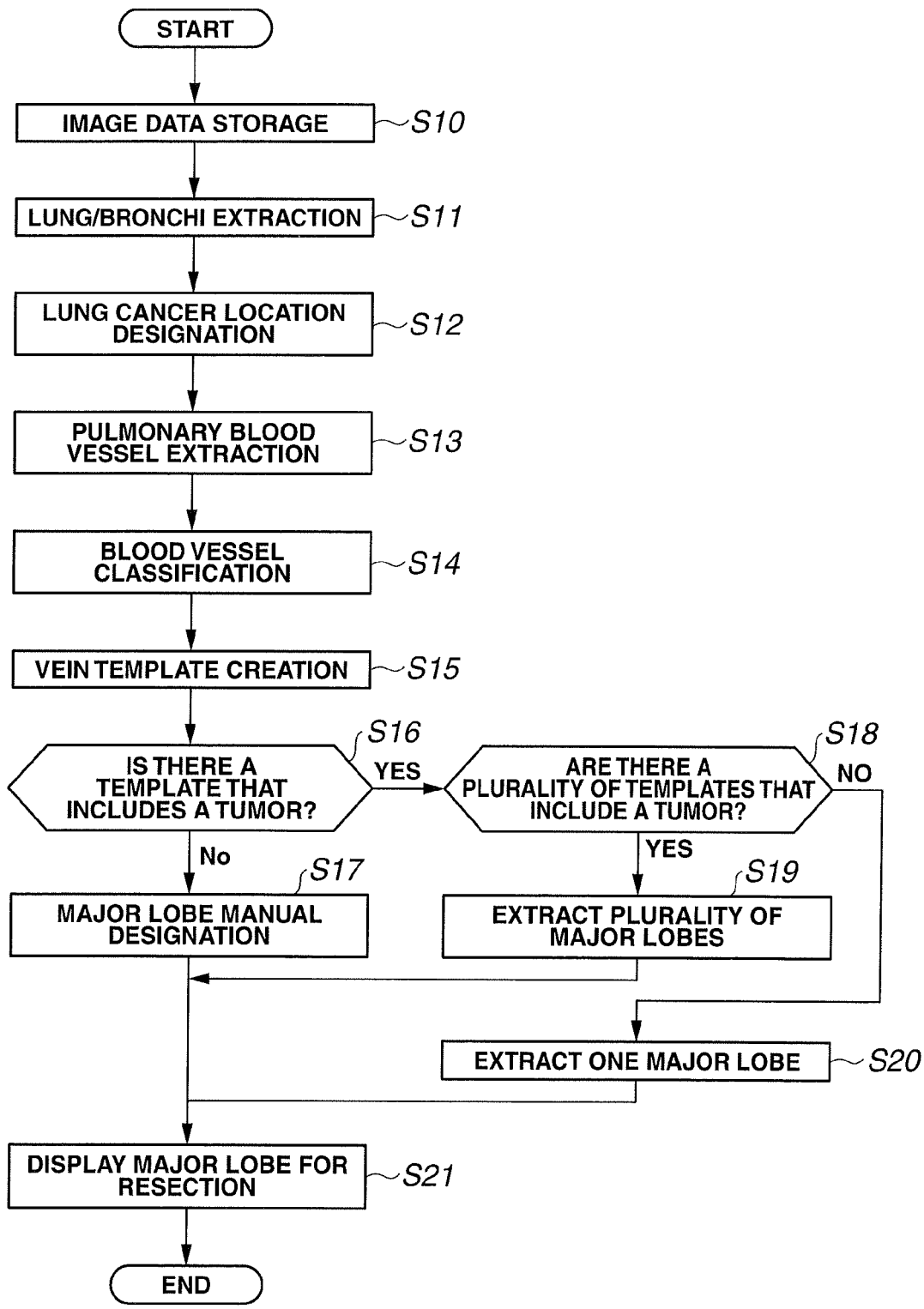
FIG. 4 is a flowchart for describing operations of the navigation apparatus according to the first embodiment.

Hereunder, operations of the navigation apparatus 1 are described according to the flowchart shown in FIG. 4.

<Step S10> Data Storage Step

X-ray tomographic data, for example, three-dimensional image data in DICOM (Digital Imaging and Communication in Medicine) format, of the examinee that is generated with a known CT apparatus (not shown) is received by the navigation apparatus 1 through a receiving portion (not shown), and is stored in the storage portion 21 that is a semiconductor storage device or a magnetic recording device or the like.

<Step S11> Organ Extraction Step

The organ extracting portion 22 extracts a predetermined organ, that is, the lungs and bronchi as an organ that is the treatment target from the three-dimensional image data that is stored in the storage portion 21. Here, a term "extract" refers to obtaining three-dimensional shape information of the lungs shown in FIG. 1 and the bronchi shown in FIG. 2. Note that when data of a tumor is included in the three-dimensional image data, three-dimensional shape information of the tumor is also extracted.

The three-dimensional shape information of the lungs, bronchi and tumor that the organ extracting portion 22 extracts is displayed on the display portion 11. At this time, in order to clearly show the positions of the bronchi and tumor or the like, preferably the lungs are displayed as a transparent image.

<Step S12> First Region (Tumor) Designating Step

For example, the surgeon designates a first region, more specifically, a size and a position of a tumor, in an image of the lungs that is being displayed on the display portion 11, by means of the first region designating portion 23 through the input portion 12. The first region may also be designated by CAD (Computer-Aided Detection).

<Step S13> Blood Vessel Extraction Step

The blood vessel extracting portion 24 extracts three-dimensional shape information of blood vessels, more specifically, pulmonary arteries and pulmonary veins, inside the lungs. As shown in FIG. 2, the pulmonary blood vessels form vascular networks that are composed of groups of blood vessels that branch out in stages from thicker blood vessels. The respective vascular networks supply oxygen and nutrition to tissue of regions that are classified according to the anatomical features thereof.

<Step S14> Blood Vessel Classifying Step

The navigation apparatus 1 classifies the blood vessels inside the lungs that are extracted in the organ extraction step into either arteries or veins. For example, blood vessels that are adjacent to the bronchi and parallel to the bronchi are classified as pulmonary arteries, and blood vessels that are between one pulmonary artery and another pulmonary artery are classified as pulmonary veins. As shown in FIG. 2, the fact that pulmonary arteries and pulmonary veins form a plurality of vascular networks that branch out in stages from thicker blood vessels is also utilized for classification of peripheral blood vessels. The blood vessels of the respective pulmonary veins that are branched out are associated with any one of the major lobes.

<Step S15> Template Creation Step

Based on the three-dimensional image information of the veins, the template creating portion 27 increases the respective blood vessel diameters by a predetermined amount to create a vein region template composed of a vein-related region in which, for example, an external diameter of the blood vessels is increased n-fold. Here, for example, n is between 2 and 10. In this connection, a configuration may be adopted in which the proportion of increase in the blood vessel diameter is determined according to a method that adds a predetermined value. Further, if a region in which adjacent blood vessels overlap is generated when the diameters are increased, a place that is the same distance from both blood vessels is taken as a boundary.

Figure 5A:
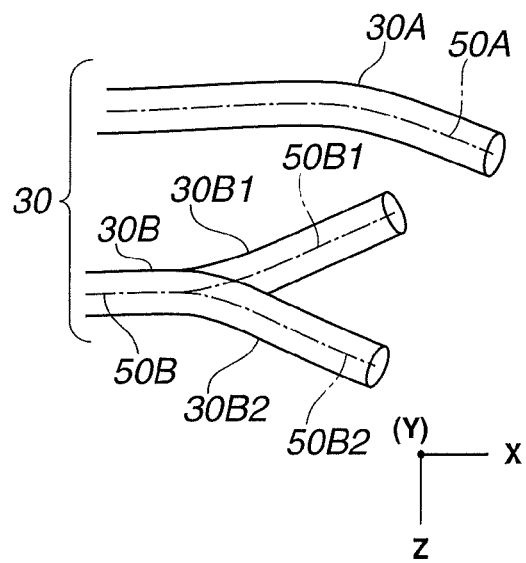
FIG. 5A is an explanatory diagram for describing operations of the navigation apparatus according to the first embodiment.

For example, FIG. 5A illustrates a three-dimensional shape of veins 30. In FIG. 5A, a vein 30A is one part of a vascular network belonging to a left upper lobe LU, and veins 30B1 and 30B2 are one part of a vascular network belonging to a left lower lobe LD that are branched from a vein 30B. A line in the center of each blood vessel represents a core line 50 that is obtained, for example, by joining the centers of gravity of the relevant blood vessel.

Figure 5B:
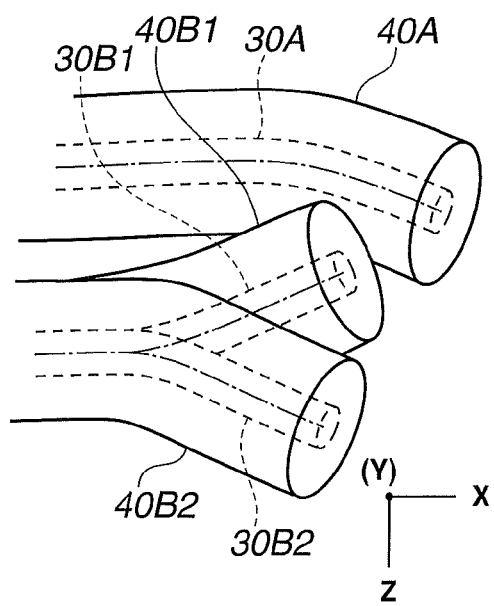
FIG. 5B is an explanatory diagram for describing operations of the navigation apparatus according to the first embodiment.

As shown in FIG. 5B, the template creating portion 27 increases the external diameter of the veins 30A, 30B1, and 30B2, for example, threefold, to create respective vein-related regions 40A, 40B1, and 40B2.

In this connection, the template creating portion 27 may create the vein-related regions 40A, 40B1, and 40B2 with respect to only either the right lung or the left lung in which the tumor exists or with respect to only the veins 30A, 30B1, and 30B2 in the vicinity of the tumor, or may create a vein-related region with respect to all the veins that are extracted in the organ extraction step.

<Step S16> Second Region Extraction Step

The second region extracting portion 26 determines whether or not ((Yes) or (No)) any of the vein-related regions includes the first region, that is, a tumor 60A, that is designated in the first region designating step.

<Step S17> Manual Selection Step (Second Region Extraction Step A)

Figure 6A:
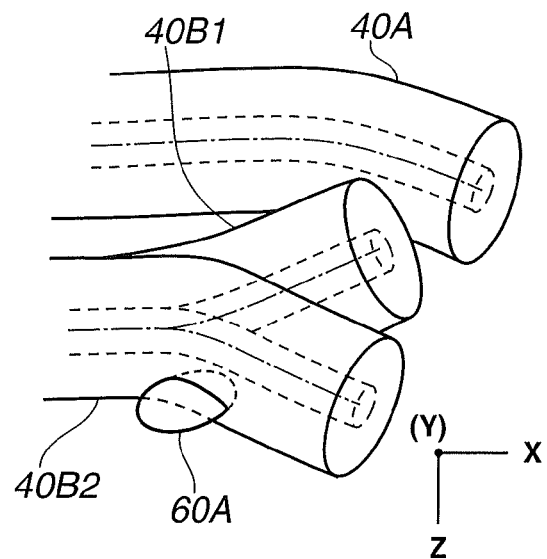
FIG. 6A is an explanatory diagram for describing operations of the navigation apparatus according to the first embodiment.
Figure 6B:
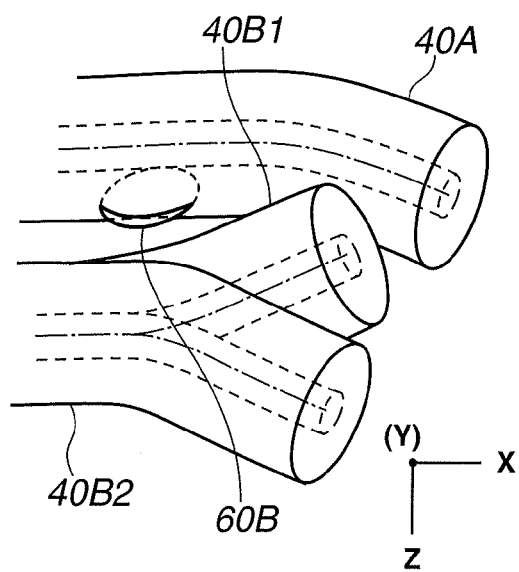
FIG. 6B is an explanatory diagram for describing operations of the navigation apparatus according to the first embodiment.
Figure 6C:
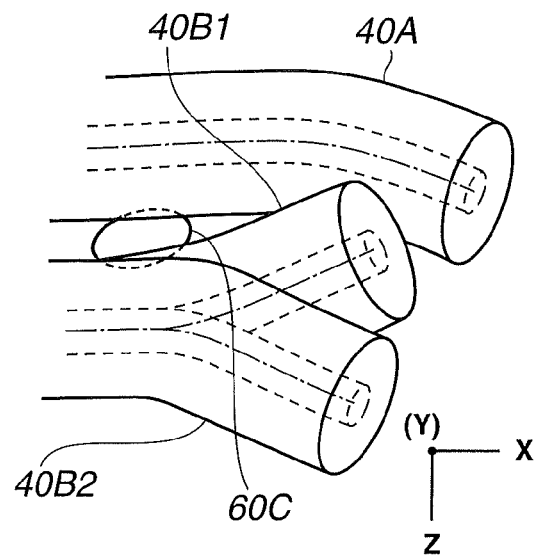
FIG. 6C is an explanatory diagram for describing operations of the navigation apparatus according to the first embodiment.
Figure 6D:
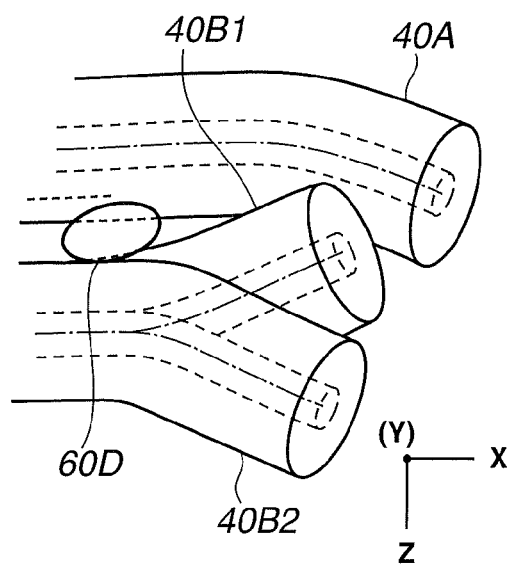
FIG. 6D is an explanatory diagram for describing operations of the navigation apparatus according to the first embodiment.

As shown in FIG. 6D, if there is no vein-related region that includes a tumor 60D, the navigation apparatus 1 enters a manual selection mode in which the surgeon selects a second region. The surgeon can select a tumor resection region through the input portion 12 while viewing an image of the lungs, bronchi, blood vessels or a tumor that is displayed on the display portion 11.

In this connection, a configuration may also be adopted in which, when there is no vein-related region that includes the tumor 60D, the surgeon resets the increase amount for the blood vessel diameter that is used when creating the vein region template, and the second region extracting portion 26 performs extraction once more under the new condition.

<Steps S18 and S19> Second Region Extraction Step B

As shown in FIG. 6C, when a tumor 60C (first region) is included in a plurality of the vein-related regions 40A and 40B1, the second region extracting portion 26 extracts the plurality of major lobes to which the respective blood vessels belong, that is, the left upper lobe LU and the left lower lobe LD, that are a basis of the vein-related regions. In other words, the second region extracting portion 26 extracts a plurality of second regions.

<Step S20> Second Region Extraction Step C

As shown in FIG. 6A, when there is a single vein-related region 40B2 that includes the tumor 60A, the second region extracting portion 26 extracts the major lobe of the lung to which the blood vessel that is the basis of the vein-related region belongs, more specifically, the left lower lobe LD, as a second region 61A. The second region 61A is a tumor resection region that is suitable for resecting the tumor 60A.

Further, for example, as shown in FIG. 6B, when the vein-related region 40A includes a tumor 60B, the second region extracting portion 26 extracts the major lobe of the lung to which the blood vessel that is the basis of the vein-related region 40A belongs, more specifically, the left upper lobe LU, as a second region 60A.

In this connection, the second region extracting portion 26 may display reference information that is calculated according to a proportion of the tumor 60A included in the vein-related region 40B2 on the display portion 11. For example, if the entire tumor 60A is included in the vein-related region 40B2, the reference information is "100%", while if a portion of the tumor 60A (for example, 30%) is included in the vein-related region 40B2 the reference information is "30%".

Furthermore, a configuration may be adopted such that the navigation apparatus 1 can be set so that the second region extracting portion 26 does not extract a second region if the proportion of the tumor 60A included in the vein-related region 40B2 is less than or equal to a predetermined value, for example, less than or equal to 5%. Preferably, the surgeon can appropriately set the predetermined value through the input portion 12. Similarly, preferably the surgeon can appropriately set a blood vessel diameter increase amount of a vein region template that the template creating portion 27 creates, through the input portion 12.

<Step S21> Resection Region Display Step

A tumor resection region (second region) that the second region extracting portion 26 extracted is displayed on the display portion 11 in a color or the like that makes the tumor resection region (second region) distinguishable from other regions.

As described above, the navigation apparatus 1 of the present embodiment can extract an appropriate tumor resection region that includes a tumor 60.

Figure 7A:
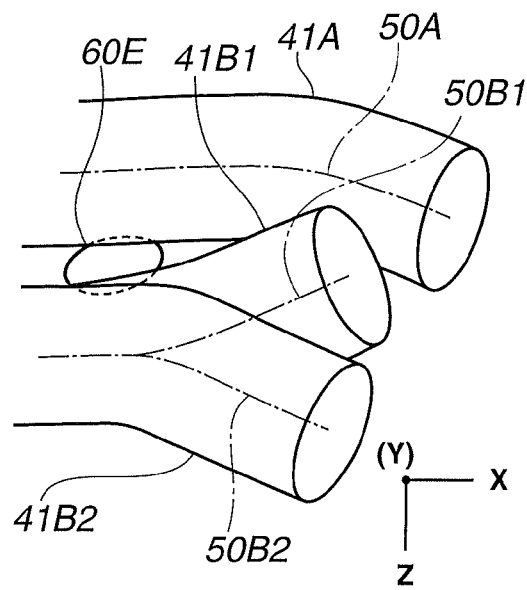
FIG. 7A is an explanatory diagram for describing operations of the navigation apparatus according to the first embodiment.

In this connection, according to the above description, the template creating portion 27 creates a vein region template composed of a vein-related region in which a blood vessel diameter is increased by a predetermined amount. However, as shown in FIG. 7A, a configuration may be adopted in which, based on core lines 50A, 50B1, and 50B2, the template creating portion 27 creates vein-related regions 41A, 41B1, and 41B2 of a predetermined diameter that are centered on core lines, and the second region extracting portion 26 extracts a second region based on a relationship between the vein-related regions 41A, 41B1, and 41B2 and a tumor 60E.

Figure 7B:
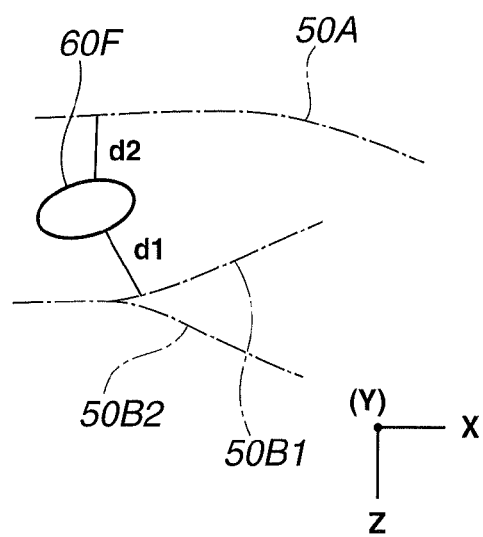
FIG. 7B is an explanatory diagram for describing operations of the navigation apparatus according to the first embodiment.

Further, as shown in FIG. 7B, an extraction method of the second region extracting portion 26 may be a method that calculates distances d1 and d2 from the core lines 50A and 50B2 to a tumor 60F, and extracts a major lobe to which the blood vessel that is the basis of a core line that is a shortest distance from the tumor 60F belongs as the second region.

Figure 7C:
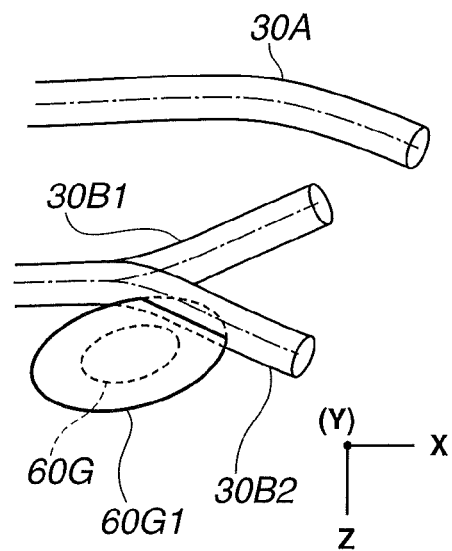
FIG. 7C is an explanatory diagram for describing operations of the navigation apparatus according to the first embodiment.

Further, as shown in FIG. 7C, a configuration may be adopted in which the template creating portion creates a tumor region template composed of a tumor-related region 60G1 in which an outer shape (contour) of a tumor 60G is increased by a predetermined amount, for example, the outer shape (contour) of the tumor 60G is increased n-fold, and the second region extracting portion extracts the second region based on a relationship between the tumor-related region 60G1 and the veins 30A, 30B1, and 30B2.

Figure 7D:
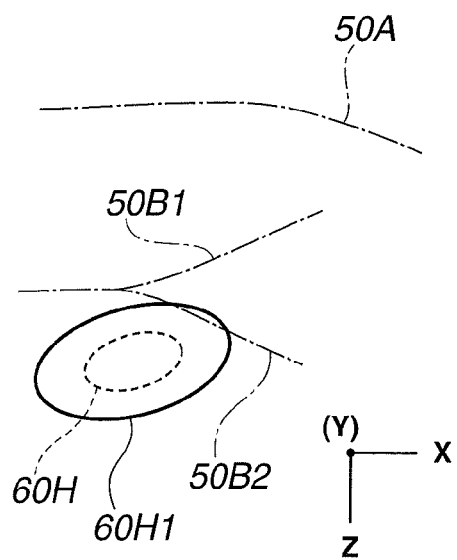
FIG. 7D is an explanatory diagram for describing operations of the navigation apparatus according to the first embodiment.

Furthermore, as shown in FIG. 7D, a configuration may be adopted in which the second region extracting portion extracts the second region based on a relationship between the core lines 50A, 50B1, and 50B2 and a tumor region template (tumor-related region) 60H in which an outer shape (contour) of a tumor 60H is increased by a predetermined amount.

As described above, the second region extracting portion 26 of the navigation apparatus 1 extracts a second region based on a distance relationship between a three-dimensional image of venous blood vessels and the first region. More specifically, the second region extracting portion 26 extracts one of the major lobes as a second region based on information regarding a vein that has been classified by the blood vessel classifying portion 25 that is a shortest distance from the first region.

<Modification Example of First Embodiment>

Next, a navigation apparatus 1A as a medical instrument according to a modification example of the first embodiment of the present invention is described. Since the navigation apparatus 1A is similar to the navigation apparatus 1 of the first embodiment, components that are the same as in the navigation apparatus 1 of the first embodiment are denoted by the same reference symbols and a description of such components is omitted.

In a case of a tumor that is localized to a pulmonary segment, the tumor can be completely resected by, for example, resecting only one of pulmonary segments 1 to 10 that constitute the major lobes or the like. In this case, in accordance with an instruction of the surgeon or the like, a second region extracting portion 26A of the navigation apparatus 1A extracts a pulmonary segment, which is a smaller region, as the second region from one of the major lobes that has been initially extracted.

Figure 8:
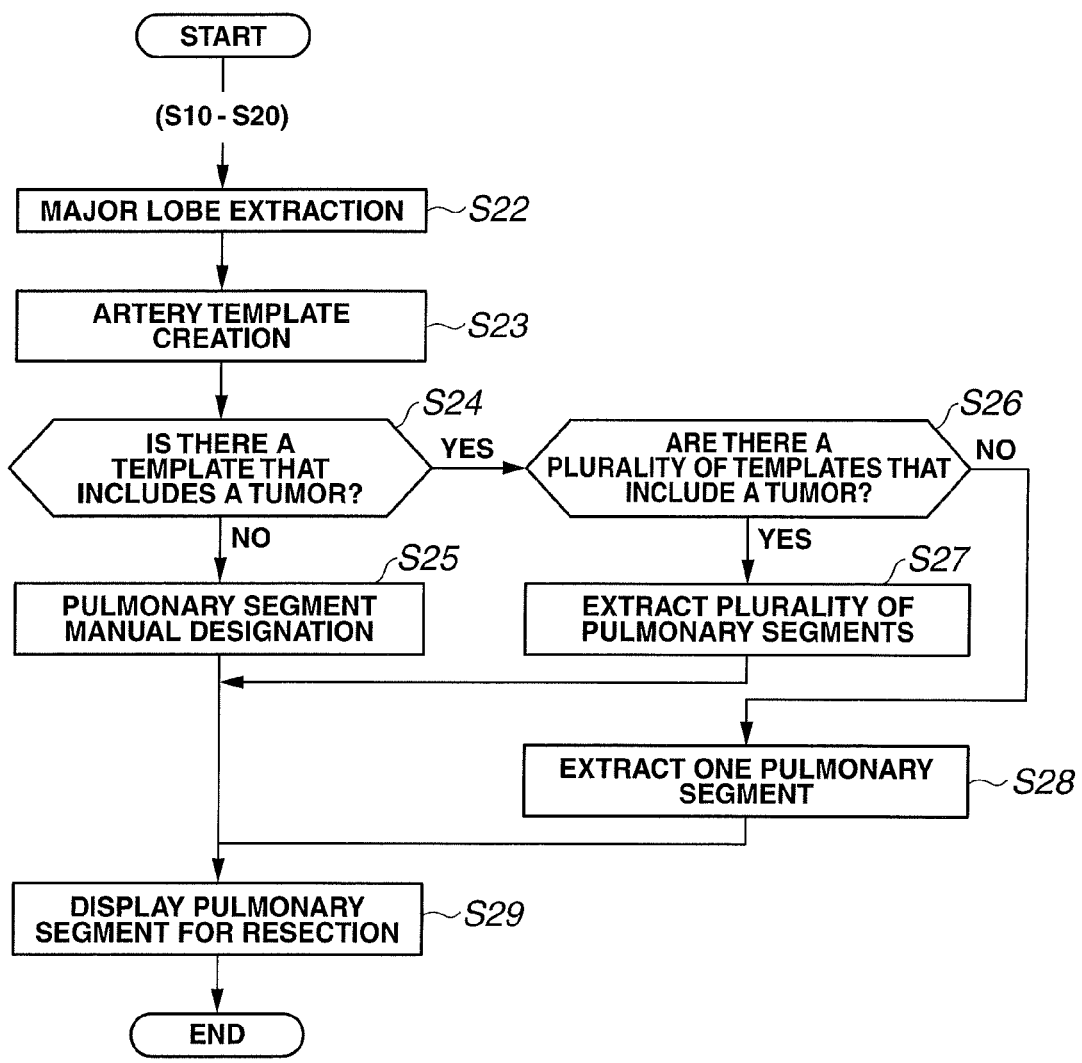
FIG. 8 is a flowchart for describing operations of a navigation apparatus according to a modification example of the first embodiment.

Hereunder, operations of the navigation apparatus 1A are described according to the flowchart shown in FIG. 8. Note that a description of the operations from S10 to S20 is omitted because the operations are the same as those of the navigation apparatus 1 shown in FIG. 4.

<Step S22> Second Region Extraction Step

According to the navigation apparatus 1 of the first embodiment, the second region extracting portion 26 extracts one of the major lobes as a second region based on a vein-related region. In contrast, the second region extracting portion 26A of the navigation apparatus 1A limits extraction of a second region to the pulmonary segments 1 to 10 that are a part of the major lobes based on an artery-related region.

More specifically, by performing the operations from S10 to S20, the second region extracting portion 26A extracts one of the major lobes, for example, the left upper lobe LU, as a tumor resection region (second region A) 61A based on a artery-related region.

<Step S23> Artery Template Creation Step

Based on three-dimensional image information of the pulmonary arteries, a template creating portion 27A creates a pulmonary artery region template composed of a pulmonary artery-related region in which respective blood vessel diameters are increased by a predetermined amount, for example, in which external diameters are increased n-fold. In this connection, similarly to the above described vein-related region, the template creating portion 27A may create an artery-related region for only part of the pulmonary arteries.

<Step S24> Second Region Extraction Step

The second region extracting portion 26A determines whether or not ((Yes) or (No)) any of the artery-related regions includes the first region, that is, the tumor 60A, that is designated in the first region designating step.

<Step S25> Manual Selection Step (Second Region Extraction Step D)

If there is no artery-related region that includes a tumor (S24=No), the navigation apparatus 1A enters a manual selection mode that allows the surgeon to select a second region.

In this connection, similarly to when extracting a major lobe, the second region extracting portion 26A may extract a single pulmonary segment as the second region using various methods, and may perform extraction once again after an extraction condition is changed.

<Steps S26 and S27> Second Region Extraction Step E

If a tumor (first region) is included in a plurality of artery-related regions (Yes), the second region extracting portion 26A extracts a plurality of pulmonary segments to which respective blood vessels that are a basis of the artery-related regions belong. In other words, the second region extracting portion 26A extracts a plurality of second regions 62.

<Step S28> Second Region Extraction Step F

If there is not a plurality of artery-related regions that include the tumor 60A (S26=No), the second region extracting portion 26 extracts, as a second region 62A, the pulmonary segment to which the blood vessel that is a basis of the artery-related region belongs. The second region 62A is a part of the second region 61A, and is a tumor resection region that is more suitable in order to resect the tumor 60A.

<Step S29> Resection Region Display Step

The tumor resection region (second region) that the second region extracting portion 26A extracts is displayed on the display portion 11.

As described above, the navigation apparatus 1A according to the present modification example has the advantageous effects of the navigation apparatus 1, and can also extract the second region (tumor resection region) 62 of a narrower range that includes the tumor 60A.

Second Embodiment

Next, a navigation apparatus 1B as a medical instrument according to a second embodiment of the present invention is described. Since the navigation apparatus 1B is similar to the navigation apparatus 1 of the first embodiment, components that are the same as in the navigation apparatus 1 of the first embodiment are denoted by the same reference symbols and a description of such components is omitted.

Figure 9:
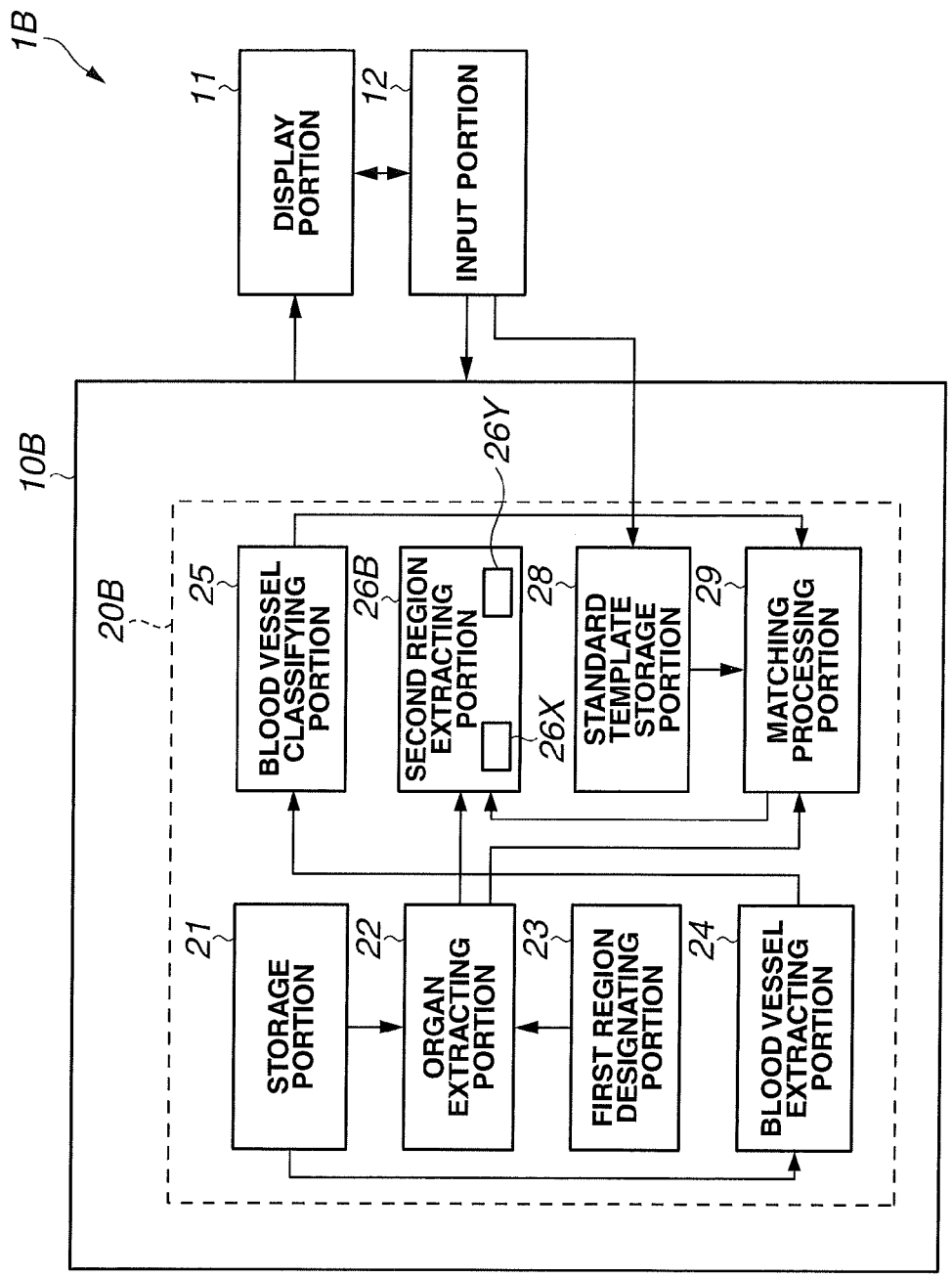
FIG. 9 is a configuration diagram for describing a configuration of a navigation apparatus according to a second embodiment.

As shown in FIG. 9, the navigation apparatus 1B includes a standard template storage portion 28 as standard template storage means and a matching processing portion 29 as matching processing means. A second region extracting portion 26B extracts a second region based on a first region that is associated with three-dimensional image information, and information of an organ according to a standard template or the like. Similarly to the navigation apparatus 1, each functional portion of an extracting unit 10B of the navigation apparatus 1B may be a program that a CPU 20B reads and executes to perform relevant operations.

The standard template storage portion 28 stores a standard template that is composed of three-dimensional shape information of standard organs and blood vessels inside the organs and the like that is based on, at least, a gender, a body type, and an age of the examinee. The matching processing portion 29 performs matching processing between the standard template and the three-dimensional shape information of the examinee.

Figure 10:
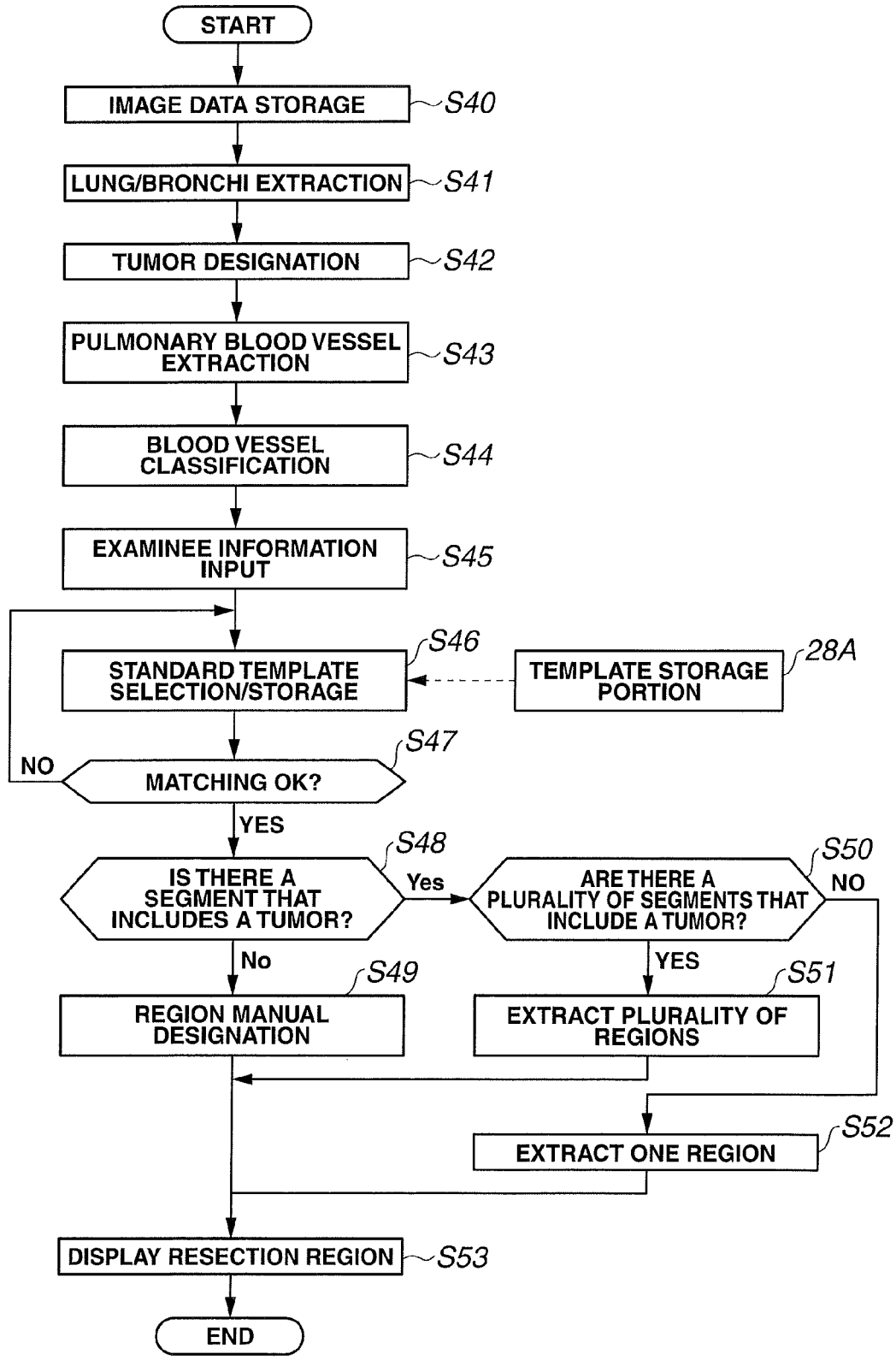
FIG. 10 is a flowchart for describing operations of the navigation apparatus according to the second embodiment.

Hereunder, operations of the navigation apparatus 1B are described according to the flowchart shown in FIG. 10.

<Step S40> Data Storage Step

X-ray tomographic data, for example, three-dimensional image data in DICOM (Digital Imaging and Communication in Medicine) format, of the examinee that is generated with an known CT apparatus (not shown) is received by the navigation apparatus 1B through an unshown receiving portion, and is stored in the storage portion 21 that is a semiconductor storage device or a magnetic recording device or the like.

<Step S41> Organ Extraction Step

The organ extracting portion 22 extracts a predetermined organ, for example, the lungs 2 and bronchi 3 from the three-dimensional image data that is stored in the storage portion 21. If data of a tumor is included in the three-dimensional image data, three-dimensional shape information of the tumor 60 is also extracted.

<Step S42> First Region (Tumor) Designating Step

For example, the surgeon designates a first region, more specifically, a position and a size of a tumor, in an image of the lungs that is being displayed on the display portion 11, by means of the first region designating portion 23 through the input portion 12. The first region may also be designated by CAD (Computer-Aided Detection).

<Step S43> Blood Vessel Extraction Step

The blood vessel extracting portion 24 extracts three-dimensional shape information of blood vessels, more specifically, pulmonary arteries 4 and pulmonary veins 5, inside the lungs.

<Step S44> Blood Vessel Classifying Step

The navigation apparatus 1B classifies the blood vessels inside the lungs that are extracted in the organ extraction step into either pulmonary arteries 4 or pulmonary veins 5.

<Step S45> Examinee Information Input Step

The surgeon inputs information showing at least the gender, the body type, and the age of the examinee through the input portion 12. In addition to the gender, body type, and age, information that is inputted may include body weight, height, chest measurement and the like of the examinee.

<Step S46> Standard Template Selection/Storage Step

A standard template 70 composed of three-dimensional shape information of a standard organ and blood vessels inside the organ that is based on the information regarding the examinee is stored in the standard template storage portion 28.

The standard template 70 may be selected from among a large number of templates that are stored in a template storage portion 28A, or may be created on a basis of inputted information, or may be a template obtained by further modifying a selected template. In addition to three-dimensional shape information of the lungs 2, the bronchi 3, and the pulmonary blood vessels 4 and 5, the standard template also includes boundary information regarding the major lobes/pulmonary segments.

<Step S47> Matching Processing Step

The matching processing portion 29 performs matching processing between the standard template 70 and the three-dimensional shape information of the examinee. The matching processing portion 29 performs at least either one of matching processing between three-dimensional shape information of the blood vessels of the standard template 70 and three-dimensional image information of the blood vessels extracted by the blood vessel extracting portion 24, and matching processing between three-dimensional shape information of the organ of the standard template and three-dimensional image information of the organ that is extracted by the organ extracting means.

Figure 11A:
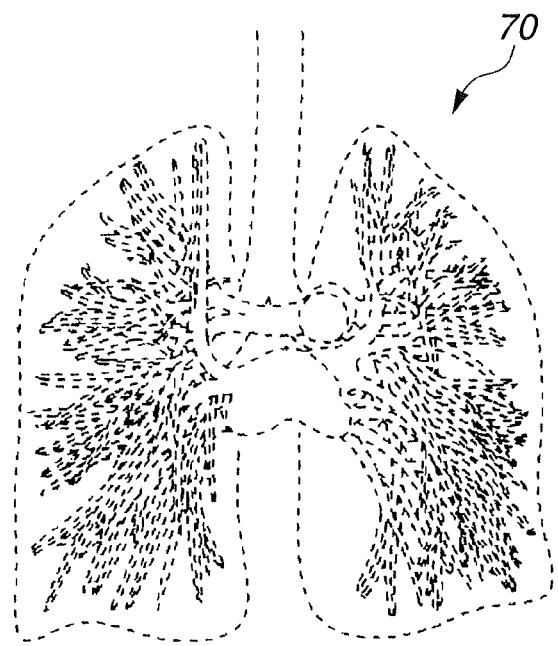
FIG. 11A is a view that illustrates a standard template for describing matching processing of the navigation apparatus according to the second embodiment.
Figure 11B:
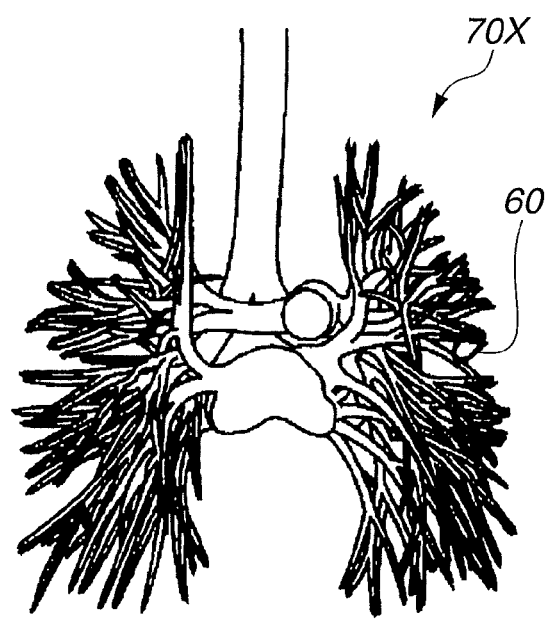
FIG. 11B is a view that illustrates a three-dimensional image of an examinee for describing matching processing of the navigation apparatus according to the second embodiment.
Figure 11C:
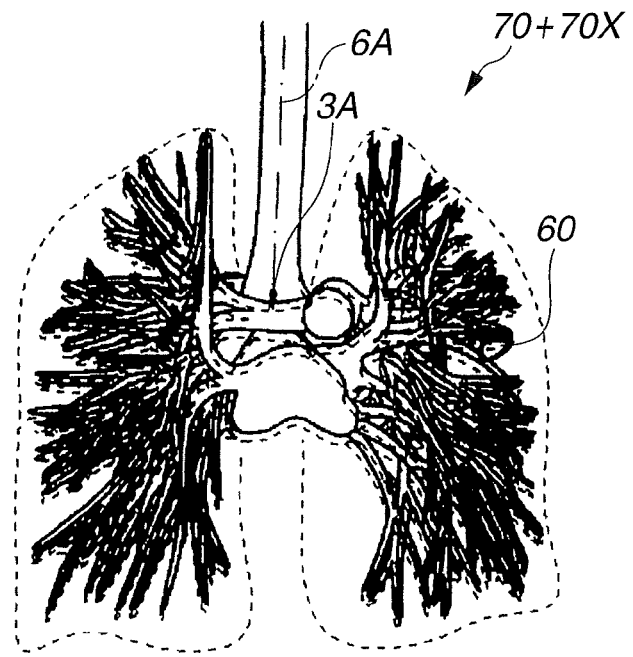
FIG. 11C is a view that illustrates a matching processing state for describing matching processing of the navigation apparatus according to the second embodiment.

More specifically, the matching processing portion 29 performs matching processing that takes at least any one of "bronchi (organ) 3", "bronchi (organ) 3+pulmonary blood vessels 4 and 5", "pulmonary blood vessels 4 and 5", "pulmonary arteries 4", and "pulmonary veins 5" as a target. For example, FIG. 11A illustrates the standard template 70, FIG. 11B illustrates three-dimensional shape information 70X of the examinee, and FIG. 11C illustrates a state in which matching processing is performed between the standard template 70 and the three-dimensional shape information 70X of the examinee.

In this connection, after performing matching processing that takes the bronchi 3 as a target, in order to obtain a more accurate result, matching processing may be performed that takes the pulmonary blood vessels 4 and 5 as a target. As described later, preferably matching processing that takes at least "blood vessels 4 and 5" as a target is performed.

The matching processing may be performed by known image processing, and may use either matching at a pixel data level or matching at a level of features extracted from an image.

If an error e between two images that is calculated by comparing a similarity between the standard template 70 and the three-dimensional shape information of the examinee is greater than an allowable error e0, the matching processing portion 29 may change the selected standard template to a different standard template and perform the matching processing once more, or may switch to a manual selection mode (S51).

Here, a term "error e between the images" refers to, for example, when the bronchi 3 are the target of the matching processing as shown in FIG. 11C, a total value of positional deviations at a peripheral plurality of bronchial branch points when matching processing is performed using a tracheal core line 6A at the carina 3A at which the trachea 6 is connected to the bronchi 3.

<Step S48> Second Region Extraction Step

The second region extracting portion 26B judges whether a tumor 60J of the examinee after the matching processing is included in any region of the lungs in the standard template 70. In this case, a term "region" refers to a major lobe of the lung or a pulmonary segment.

As described according to the first embodiment, in particular, by performing matching processing that takes the pulmonary veins 5 as a target, a high accuracy is obtained when extracting a major lobe of the lung as the second region, and by performing matching processing that takes the pulmonary arteries 4 as a target, a high accuracy is obtained when extracting a pulmonary segment as the second region. Consequently, the matching processing step and the second region extraction step may be repeatedly performed. More specifically, after performing a first matching processing operation that takes "pulmonary veins 5" as a target and extracting one of the major lobes, a second matching processing operation that takes the "pulmonary arteries 4" as a target may be performed to extract a single pulmonary segment inside the extracted major lobe.

<Step S49> Manual Selection Step (Second Region Extraction Step G)

If there is no region that includes the tumor 60D (S48=No), the navigation apparatus 1 enters a manual selection mode that allows the surgeon to select the second region.

<Steps S50 and S51> Second Region Extraction Step H

If the tumor 60J (first region) is included in a plurality of regions, the second region extracting portion 26B extracts the plurality of regions. In other words, the second region extracting portion 26B extracts a plurality of second regions.

<Step S52> Second Region Extraction Step I

If the tumor 60J (first region) is included in a single region, the second region extracting portion 26B extracts that region.

<Step S53> Resection Region Display Step

A tumor resection region (second region) that the second region extracting portion 26B extracts is displayed on the display portion 11.

As described above, the navigation apparatus 1B of the present embodiment has the same advantageous effects as those of the navigation apparatus 1 of the first embodiment or the like.

Figure 12A:
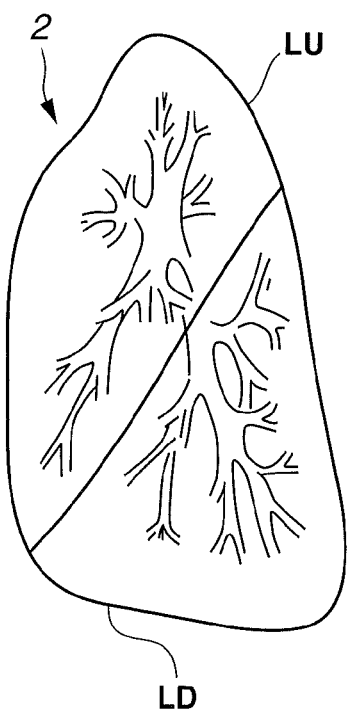
FIG. 12A is a view that illustrates a standard template for describing matching processing of the navigation apparatus according to the second embodiment.
Figure 12B:
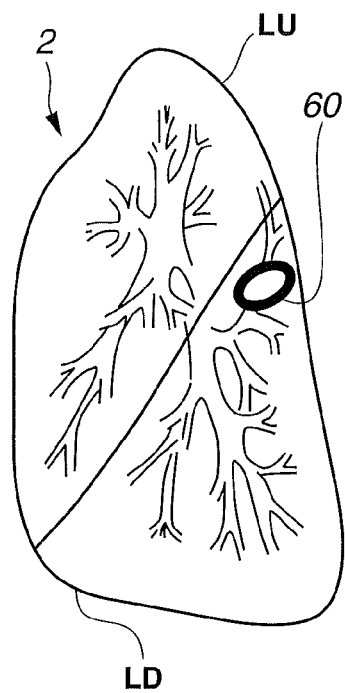
FIG. 12B is a view that illustrates a three-dimensional image of an examinee for describing matching processing of the navigation apparatus according to the second embodiment.

In this connection, in some cases a state in which the blood vessels of an examinee are arranged or the like may differ significantly from the standard template due to individual differences. For example, in some cases, depending on the examinee, an end of a lower lobar vein that remains inside the left lower lobe LD in the standard template that is shown in FIG. 12A, extends as far as the left upper lobe LU as shown in FIG. 12B.

Figure 12C:
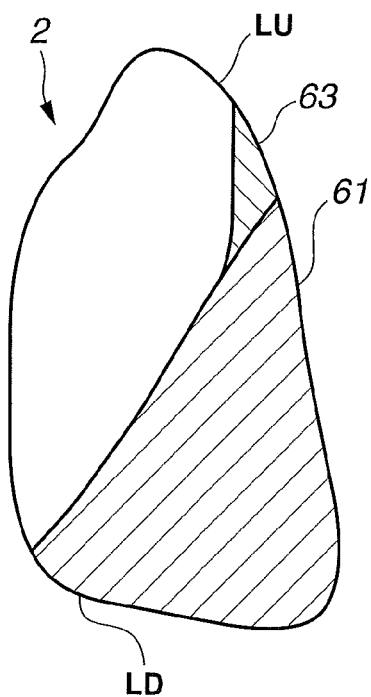
FIG. 12C is a view that illustrates a tumor resection region for describing matching processing of the navigation apparatus according to the second embodiment.

In such a case, as shown in FIG. 12C, preferably the second region extracting portion 26B extracts a third region 63 that belongs to the same vascular network, as a tumor resection additional region. The third region 63 that is shown in FIG. 12C is a pulmonary segment 2 (LU2) of the left upper lobe LU. Further, as shown in FIG. 12C, preferably an image that is displayed on the display portion 11 calls a surgeon's attention to the third region 63 by displaying the third region 63 using hatching or a display color or the like that is different from that of a second region 61.

Furthermore, when the arrangement or the like of the blood vessels of the examinee differs significantly from the standard template, even if a difference is at a position that is not related to a tumor resection region, the navigation apparatus 1B may display a display that is designed to call the attention of the surgeon to the difference.

Although an example of extracting a tumor resection region of the lungs has been described above, navigation can also be performed by a similar method for another organ, for example, a liver. More specifically, when performing a resection of the liver, any of a sub-regional resection, a regional resection, a lobectomy, and an extended right lobectomy is performed, and the navigation apparatus can extract an appropriate tumor resection region and display the extracted tumor resection region to the surgeon.

Note that the present invention is not limited to the above described embodiments, and various changes and modifications and the like can be made within a range that does not depart from the spirit and scope of the invention.

What is claimed is:

1. A medical instrument, comprising:
    a storage portion that stores three-dimensional image data of inside a body of an examinee that is previously acquired;
    an organ extracting portion that extracts a predetermined organ from the three-dimensional image data;
    a first region designating portion that designates a first region of the organ in the three-dimensional image data;
    a blood vessel extracting portion that extracts a plurality of blood vessels that are inside the organ from the three-dimensional image data;
    a blood vessel classifying portion that classifies the plurality of blood vessels that the blood vessel extracting portion extracts into either arteries or veins;
    a template creating portion that creates a blood vessel region template comprising a blood vessel-related region in which a diameter of at least either one of the arteries and the veins classified by the blood vessel classifying portion is increased by a predetermined amount; and
    a second region extracting portion that, based on the blood vessel region template, extracts a second region that is a region that is classified according to anatomical features of the organ and that includes the first region.

2. The medical instrument according to claim 1, wherein the second region extracting portion extracts the second region from three-dimensional image information of a blood vessel that is at a shortest distance from the first region.

3. The medical instrument according to claim 2, wherein when there are a plurality of the blood vessel-related regions that each include the first region, the second region extracting portion extracts a plurality of the second regions.

4. A medical instrument, comprising:
a storage portion that stores three-dimensional image data of inside a body of an examinee that is previously acquired;
an organ extracting portion that extracts a predetermined organ from the three-dimensional image data;
a first region designating portion that designates a first region of the organ in the three-dimensional image data;
a blood vessel extracting portion that extracts a plurality of blood vessels that are inside the organ from the three-dimensional image data;
a blood vessel classifying portion that classifies the plurality of blood vessels that the blood vessel extracting portion extracts into either arteries or veins;
a standard template storage portion that stores a standard template comprising standard three-dimensional shape information of the organ and the plurality of blood vessels that is based on at least a gender, a body type, and an age of the examinee;
a matching processing portion that performs at least either one of matching processing between the three-dimensional shape information of the plurality of blood vessels of the standard template and the three-dimensional image information of the plurality of blood vessels that the blood vessel extracting portion extracts, and matching processing between the three-dimensional shape information of the organ of the standard template and the three-dimensional image information of the organ that the organ extracting portion extracts; and
a second region extracting portion that, based on a processing result of the matching processing portion, extracts a second region that is a region that is classified according to anatomical features of the organ and that includes the first region.

5. The medical instrument according to claim 4, wherein:
the first region is a tumor region; and
the second region is a tumor resection region.

6. The medical instrument according to claim 5, wherein:
the organ is a lung including a bronchus; and
the second region extracting portion extracts any one major lobe from among a right upper lobe, a right middle lobe, a right lower lobe, a left upper lobe, and a left lower lobe as the second region from the three-dimensional image information of the veins.

7. The medical instrument according to claim 6, wherein:
the second region extracting portion further extracts a sub-region in the major lobe as the second region from the three-dimensional image information of the arteries.

8. The medical instrument according to claim 6, further comprising:
a third region extracting portion that, based on the three-dimensional image information of the plurality of blood vessels, extracts a region adjacent to the second region that is extracted by the second region extracting portion, as a third region that is a tumor resection additional region.

9. The medical instrument according to claim 8, wherein a blood vessel of the third region belongs to an identical vascular network as a blood vessel of the second region.

10. A medical instrument control method, comprising:
a data storage step of storing three-dimensional image data of inside a body of an examinee that is previously acquired;
an organ extraction step of extracting a predetermined organ from the three-dimensional image data;
a first region designating step of designating a first region of the organ in the three-dimensional image data;
a blood vessel extraction step of extracting a plurality of blood vessels that are inside the organ from the three-dimensional image data;
a blood vessel classifying step of classifying the plurality of blood vessels that are extracted in the blood vessel extraction step into either arteries or veins;
a template creation step of creating a blood vessel region template comprising a blood vessel-related region in which a diameter of at least either one of the arteries and the veins classified in the blood vessel classifying step is increased by a predetermined amount; and
a second region extraction step of extracting a second region that is a region that is classified according to anatomical features of the organ and that includes the first region, based on the blood vessel region template.

11. The medical instrument control method according to claim 10, wherein:
in the second region extraction step, the second region is extracted based on a distance relationship between a three-dimensional image of at least either one of the arteries and the veins, and the first region.

12. A medical instrument control method, comprising:
a data storage step of storing three-dimensional image data of inside a body of an examinee that is previously acquired;
an organ extraction step of extracting a predetermined organ from the three-dimensional image data;
a first region designating step of designating a first region of the organ in the three-dimensional image data;
a blood vessel extraction step of extracting a plurality of blood vessels that are inside the organ from the three-dimensional image data;
a blood vessel classifying step of classifying the plurality of blood vessels that are extracted in the blood vessel extraction step into either arteries or veins;
a standard template storage step of storing a standard template comprising standard three-dimensional shape information of the organ and the plurality of blood vessels that is based on at least a gender, a body type, and an age of the examinee;
a matching processing step of performing at least either one of matching processing between the three-dimensional shape information of the plurality of blood vessels of the standard template and the three-dimensional image information of at least either one of the arteries and the veins classified in the blood vessel classifying step, and matching processing between the three-dimensional shape information of the organ of the standard template and the three-dimensional image information of the organ that is extracted in the organ extraction step; and
a second region extraction step of extracting a second region that is a region that is classified according to anatomical features of the organ and that includes the first region, based on a result of the matching processing step.

* * * * *